(12) United States Patent
Saito et al.

(10) Patent No.: US 12,296,401 B2
(45) Date of Patent: May 13, 2025

(54) SPOT WELDING METHOD

(71) Applicant: HONDA MOTOR CO., LTD., Tokyo (JP)

(72) Inventors: Hitoshi Saito, Tochigi (JP); Shinya Watanabe, Tochigi (JP); Xihao Tan, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1051 days.

(21) Appl. No.: 17/273,732

(22) PCT Filed: Aug. 20, 2019

(86) PCT No.: PCT/JP2019/032471
§ 371 (c)(1),
(2) Date: Mar. 5, 2021

(87) PCT Pub. No.: WO2020/050011
PCT Pub. Date: Mar. 12, 2020

(65) Prior Publication Data
US 2021/0187654 A1 Jun. 24, 2021

(30) Foreign Application Priority Data

Sep. 5, 2018 (JP) .................................. 2018-165771

(51) Int. Cl.
*B23K 11/11* (2006.01)
*B23K 11/25* (2006.01)
*B23K 101/18* (2006.01)

(52) U.S. Cl.
CPC ........... *B23K 11/115* (2013.01); *B23K 11/257* (2013.01); *B23K 2101/18* (2018.08)

(58) Field of Classification Search
CPC . B23K 11/115; B23K 11/257; B23K 2101/18; B23K 11/11; B23K 11/24
See application file for complete search history.

(56) References Cited

U.S. PATENT DOCUMENTS

| | | | | |
|---|---|---|---|---|
| 5,748,462 A | * | 5/1998 | Moro ................... | B23K 11/257 219/110 |
| 5,866,866 A | * | 2/1999 | Shimada .............. | B23K 11/257 219/110 |

(Continued)

FOREIGN PATENT DOCUMENTS

| | | |
|---|---|---|
| CN | 104661784 A | 5/2015 |
| CN | 105358284 A | 2/2016 |

(Continued)

OTHER PUBLICATIONS

KR-200312742-Y1 (Seongho L) May 16, 2003 [retrieved on Jun. 25, 2024]. Retrieved from Espacenet Database, translation by EPO and Google. (Year: 2003).*

*Primary Examiner* — John J Norton
*Assistant Examiner* — Franklin Jefferson Wang
(74) *Attorney, Agent, or Firm* — CKC & Partners Co., LLC

(57) ABSTRACT

This spot welding method is a method for joining workpieces being a layered body of three or more metal sheets by supplying welding current. The welding current has a pulse-like waveform wherein a peak state in which the current reaches or is maintained to be within a set peak current range and a non-peak state in which the current is lowered from the peak current range to a set bottom current, and is then increased toward the peak current range again are alternately achieved. In the non-peak state, in the case where an effective value Irms of the welding current is lowered, and reaches a predetermined effective value target range, a current control process for increasing the welding current toward the peak current range is started.

4 Claims, 8 Drawing Sheets

(56) References Cited

U.S. PATENT DOCUMENTS

| | | | |
|---|---|---|---|
| 6,455,802 B2* | 9/2002 | Watanabe | B23K 11/257 |
| | | | 219/113 |
| 2012/0126780 A1* | 5/2012 | Watanabe | B23K 11/256 |
| | | | 219/78.01 |
| 2015/0174690 A1 | 6/2015 | Furusako et al. | |
| 2016/0067913 A1* | 3/2016 | Draht | B29C 65/02 |
| | | | 156/359 |
| 2016/0144451 A1 | 5/2016 | Fujimoto et al. | |
| 2016/0207139 A1 | 7/2016 | Fukumoto et al. | |
| 2017/0106466 A1* | 4/2017 | Sigler | B23K 11/185 |

FOREIGN PATENT DOCUMENTS

| | | | |
|---|---|---|---|
| DE | 102016200351 A1 * | 7/2017 | |
| JP | 2013501628 A | 1/2013 | |
| JP | 2013111586 A | 6/2013 | |
| JP | 2013151018 A | 8/2013 | |
| KR | 200312742 Y1 * | 5/2003 | |
| KR | 20110026357 A * | 3/2011 | |
| WO | 2011019430 A1 | 2/2011 | |
| WO | 2015037652 A1 | 3/2015 | |

\* cited by examiner

SPOT WELDING METHOD

TECHNICAL FIELD

The present invention relates to a spot welding method.

BACKGROUND ART

In the case of welding a plurality of metal plates to each other, spot welding using a spot welding apparatus is performed. In spot welding, power is distributed between a pair of electrode chips in a state in which the plurality of metal plates is sandwiched between the pair of electrode chips, and in this manner, a nugget is generated between the plurality of metal plates to weld the plurality of metal plates.

In a technique described in Patent Document 1, a plurality of DC micropulses is applied to a plurality of metal plates in a state in which the plurality of metal plates is sandwiched by a pair of electrodes, and in this manner, the plurality of metal plates is welded to each other.

In spot welding, in a case where the time of power distribution to between the pair of electrode chips is short, the nugget cannot be grown to a size necessary for welding and welding cannot be performed in some cases. On the other hand, in a case where the time of power distribution between the pair of electrode chips is long, the nugget grows too much and protrudes from a corona bond (an unmelted pressure-contact portion formed outside the nugget) formed between the plurality of metal plates in some cases. As a result, the nugget is exposed, and spatter might be caused. Due to such a situation, it has been demanded in spot welding for welding to be reliably performed while occurrence of the spatter is reduced.

Patent Document 1: Japanese Unexamined Patent Application (Translation of PCT Application), Publication No. 2013-501628

DISCLOSURE OF THE INVENTION

Problems to be Solved by the Invention

At the step of manufacturing a vehicle body of an automobile, it is necessary to weld three or more metal plates with different thicknesses in some cases. In this case, a contact resistance between thick plates is greater than a contact resistance between a thin plate and a thick plate, and therefore, a nugget formed between the thick plates is grown faster than a nugget formed between the thin plate and the thick plate. Thus, when power distribution is continued until the nugget between the thin plate and the thick plate is sufficiently grown, the nugget between the thick plates grows too much, and for this reason, spatter might be caused.

An object of the present invention is to provide a spot welding method configured so that a workpiece can be reliably joined while occurrence of spatter is reduced.

Means for Solving the Problems (1) The spot welding method according to the present invention is the method for joining a workpiece (e.g., a later-described workpiece W) by a supply of welding current. The welding current has such a pulse-shaped waveform that a peak state in which the welding current reaches or is maintained within a set peak current range and a non-peak state in which the welding current increases to the peak current range again after having decreased from the peak current range to a bottom current are alternately achieved. In the non-peak state, the current control of increasing the welding current to the peak current range is started in a case where an effective value (Irms) of the welding current reaches within a predetermined target range (e.g., a later-described target effective value range).

(2) In this case, if the current control is not started within a predetermined time, the supply of welding current is preferably stopped and occurrence of an abnormality is preferably informed.

(3) In this case, the workpiece is preferably a multilayer body configured such that three or more metal plates (e.g., later-described metal plates W1, W2, W3) are stacked on each other, and at least one metal plate of the three or more metal plates is preferably formed to have a thickness different from the thicknesses of the other metal plates.

Effects of the Invention (2) In the spot welding method of the present invention, the welding current having such a pulse-shaped waveform that the peak state in which the welding current reaches or is maintained within the peak current range and the non-peak state in which the welding current increases to the peak current range again after having decreased from the peak current range to the bottom current are alternately achieved is supplied to join the workpiece. In the present invention, in the non-peak state, the current control of increasing the welding current to the peak current range is started in a case where the effective value of the welding current reaches within the predetermined target range. In other words, in the present invention, the start of the current control for a subsequent cycle is put on hold until the effective value of the welding current reaches within the target range. With this configuration, the current control can be started at such proper timing that occurrence of spatter is reduced while energy for forming a proper size of a nugget by the welding current is supplied to the workpiece. Thus, according to the present invention, the workpiece can be reliably joined while occurrence of the spatter is reduced.

(2) In the present invention, in a case where the current control of increasing the welding current to the peak current range is not started within the predetermined time, the supply of welding current is stopped and occurrence of the abnormality is informed. With this configuration, continuation of welding in a case where some types of abnormalities are caused and manufacture of a low-quality product can be prevented.

(3) In the spot welding method of the present invention, the workpiece is the multilayer body configured such that the three or more metal plates are stacked on each other, and at least one metal plate has the thickness different from those of the other metal plates. In the peak state, the welding current reaches or is maintained within the peak current range, and therefore, growth of a nugget is accelerated between the metal plates. While the start of the current control for the subsequent cycle is put on hold until the effective value of the welding current reaches within the target range in the non-peak state as described above, the nugget is cooled by heat dissipation. As described above, the contact resistance between the thick plates is greater than that between the thin plate and the thick plate, and growth of the nugget between the thick plates is faster than that between the thin plate and the thick plate. Moreover, heat dissipation between the thick plates is greater than that between the thin plate and the thick plate. For this reason, in the present invention, the workpiece is the multilayer body of the metal plates as described above, and the start of the current control is put on hold until the effective value of the welding current reaches within the target range in the non-peak state. Thus, while a proper level of energy is supplied such that the nuggets are sufficiently grown between the thin plate and the thick plate and between the thick plates, the time for cooling the nugget between the thick plates can be ensured such that occurrence of the spatter between the thick plates is reduced.

PREFERRED MODE FOR CARRYING OUT THE INVENTION

Figure 1:
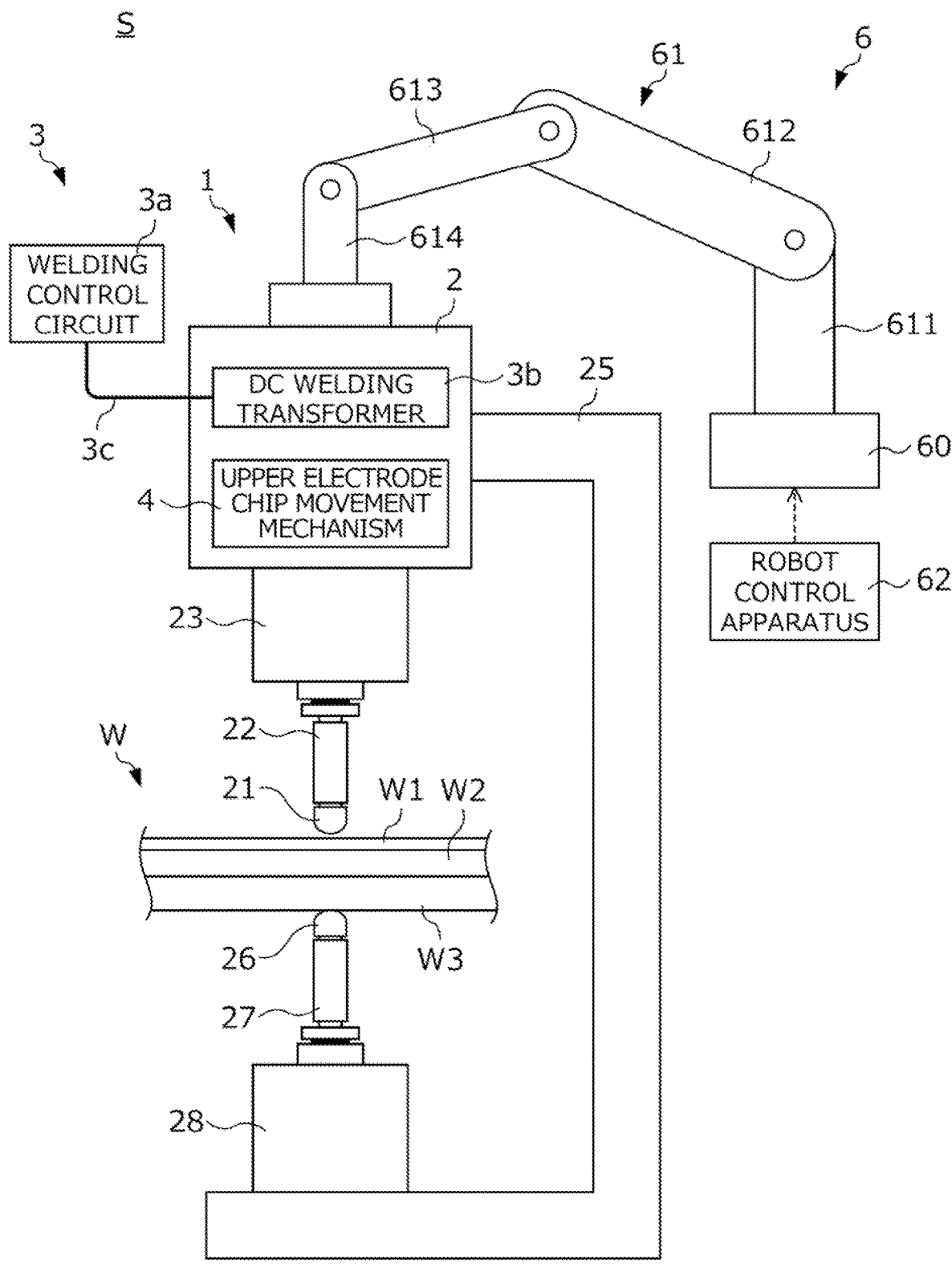
FIG. 1 is a view showing a configuration of a welding system to which a spot welding method according to one embodiment of the present invention is applied.

Hereinafter, one embodiment of the present invention will be described with reference to the drawings. FIG. 1 is a view showing a configuration of a welding system S to which a spot welding method according to the present embodiment is applied.

The welding system S includes a spot welding apparatus 1 as a welding gun, a workpiece W as a multilayer body of metal plates joined to each other by the spot welding apparatus 1, and a robot 6 supporting the spot welding apparatus 1.

The workpiece W is a multilayer body configured such that a plurality of metal plates is stacked on each other. In the present embodiment, a case where a first metal plate W1, a second metal plate W2, and a third metal plate W3 as three metal plates are stacked on each other in this order from the top to the bottom to form a multilayer body as the workpiece W will be described, but the present invention is not limited to such a case. The number of metal plates forming the workpiece W may be two or four or more. Hereinafter, a case where the thickness of the first metal plate W1 is smaller than each of the thicknesses of the second metal plate W2 and the third metal plate W3 will be described, but the present invention is not limited to such a case. It may only be required that at least one metal plate of these metal plates W1 to W3 has a thickness different from those of the other metal plates.

The robot 6 includes a robot body 60 attached to a floor surface, an articulated arm 61 pivotally supported on the robot body 60, and a robot control apparatus 62 that controls the robot 6. The articulated arm 61 includes a first arm portion 611 pivotally supported on a base end side by the robot body 60, a second arm portion 612 pivotally supported on a base end side by the first arm portion 611, a third arm portion 613 pivotally supported on a base end side by the second arm portion 612, and a fourth arm portion 614 pivotally supported on a base end side by the third arm portion 613 and attached to the spot welding apparatus 1 on a tip end side.

The robot control apparatus 62 drives a plurality of motors provided at the robot body 60 and the articulated arm 61 to drive each of the arm portions 611 to 614, thereby controlling the position and orientation of the spot welding apparatus 1 attached to the fourth arm portion 614 and moving later-described electrode chips 21, 26 provided at the spot welding apparatus 1 to a joint portion of the workpiece W.

The spot welding apparatus 1 includes a welding power circuit 3 as a welding current supply source, a gun body 2 on which a later-described upper electrode chip movement mechanism 4 and part of the welding power circuit 3 are mounted, the upper electrode chip 21 and the lower electrode chip 26 as a pair of electrodes, an upper electrode chip support portion 22, an upper adaptor body 23, a gun arm 25, a lower electrode chip support portion 27, and a lower adaptor body 28.

The upper electrode chip support portion 22 is in the shape of a rod extending along the vertical direction, and the upper electrode chip 21 is attached to a tip end portion of the upper electrode chip support portion 22. The upper adaptor body 23 is in a columnar shape, and connects the gun body 2 and the upper electrode chip support portion 22 to each other. The upper adaptor body 23 is, relative to the gun body 2, provided slidably along a sliding direction parallel with the axis of the upper electrode chip support portion 22.

The gun arm 25 extends to curve from the gun body 2 to below the upper electrode chip 21 in the vertical direction. The lower electrode chip support portion 27 is in the shape of a rod coaxial with the upper electrode chip support portion 22, and the lower electrode chip 26 is attached to a tip end portion of the lower electrode chip support portion 27. The lower adaptor body 28 is in a columnar shape, and connects a tip end portion of the gun arm 25 and the lower electrode chip support portion 27 to each other. As shown in FIG. 1, the lower electrode chip 26 is supported by the lower electrode chip support portion 27 to face the upper electrode chip 21 with a predetermined clearance along the axes of the chip support portions 22, 27.

The upper electrode chip movement mechanism 4 includes a cylinder, a control apparatus therefor, etc., and together with the upper electrode chip support portion 22 and the upper electrode chip 21, moves the upper adaptor body 23 back and forth along the sliding direction. With this configuration, the upper electrode chip 21 can contact an upper surface of the workpiece W with the lower electrode chip 26 contacting a lower surface of the workpiece W, and the workpiece W can be further sandwiched and pressurized by these electrode chips 21, 26.

Figure 2:
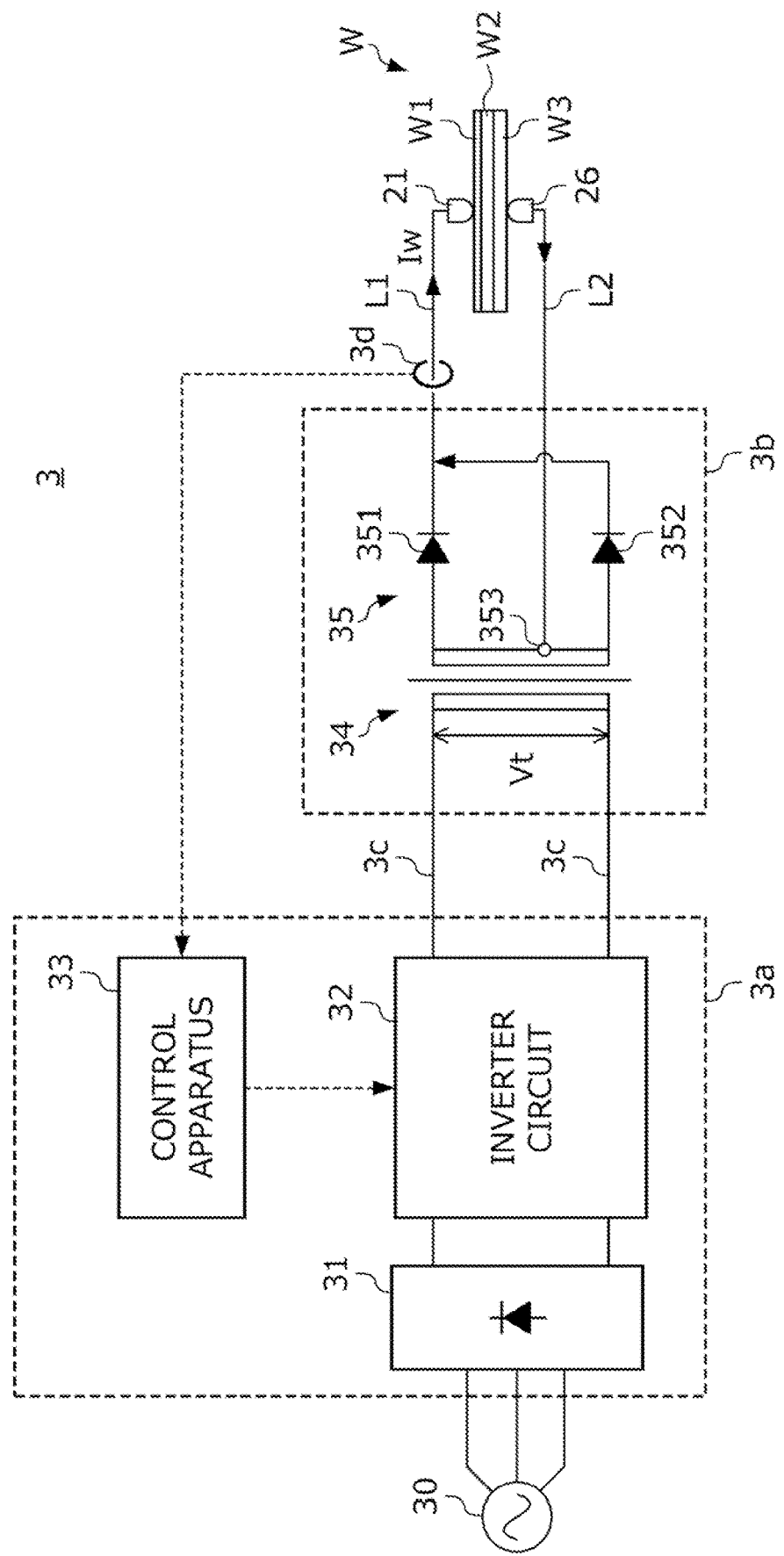
FIG. 2 is a diagram showing a circuit configuration of a welding power circuit.

FIG. 2 is a diagram showing a circuit configuration of the welding power circuit 3. The welding power circuit 3 includes a welding control circuit 3a, a DC welding transformer 3b, power cables 3c, and a current sensor 3d. The welding power circuit 3 is connected to the upper electrode chip 21 and the lower electrode chip 26 through power lines L1, L2. As shown in FIG. 1, the DC welding transformer 3b and the current sensor 3d of the welding power circuit 3 configured as described above are mounted on the gun body 2. Moreover, the welding control circuit 3a of the welding power circuit 3 is mounted on a base separated from the gun body 2, and is connected to the DC welding transformer 3b through the power cables 3c. With this configuration, the weight of the gun body 2 can be reduced.

The welding control circuit 3a includes a converter circuit 31, an inverter circuit 32, and a control apparatus 33. The DC welding transformer 3b includes a transformer 34 and a rectification circuit 35.

The converter circuit 31 performs full-wave rectification for a three-phase power input from a three-phase power source 30, thereby converting the three-phase power into a DC power and supplying the DC power to the inverter circuit 32.

The inverter circuit 32 converts the DC power input from the inverter circuit 32 into a single-phase AC power, thereby outputting the single-phase AC power to the transformer 34 through the power cables 3c. More specifically, the inverter circuit 32 includes four bridge-connected switching elements. The inverter circuit 32 turns on or off these switching elements according to a gate drive signal transmitted from a gate drive circuit mounted on the control apparatus 33, thereby converting the DC power into the single-phase AC power.

The transformer 34 transforms the AC power input from the inverter circuit 32, thereby outputting the transformed AC power to the rectification circuit 35. The rectification circuit 35 rectifies the AC power input, from the transformer 34, thereby outputting a DC power to between the electrode chips 21, 26 each connected to the power lines L1, L2. For example, a known full-wave rectification circuit including a combination of two rectification diodes 351, 352 and a center tap 353 is used as the rectification circuit 35.

The current sensor 3d detects a welding current supplied from the welding power circuit 3 to the chips 21, 26. The current sensor 3d is, for example, provided on the power line L1 connecting the rectification circuit 35 and the upper electrode chip 21 to each other, and to the control apparatus 33, transmits a current detection signal according to the level of the welding current flowing in the power line L1.

The control apparatus 33 includes, for example, a microcomputer that executes later-described welding current control by means of the current detection signal transmitted from the current sensor 3d and the gate drive circuit that generates the gate drive signal according to an arithmetic processing result of the microcomputer to transmit the gate drive signal to the inverter circuit 32.

Figure 3:
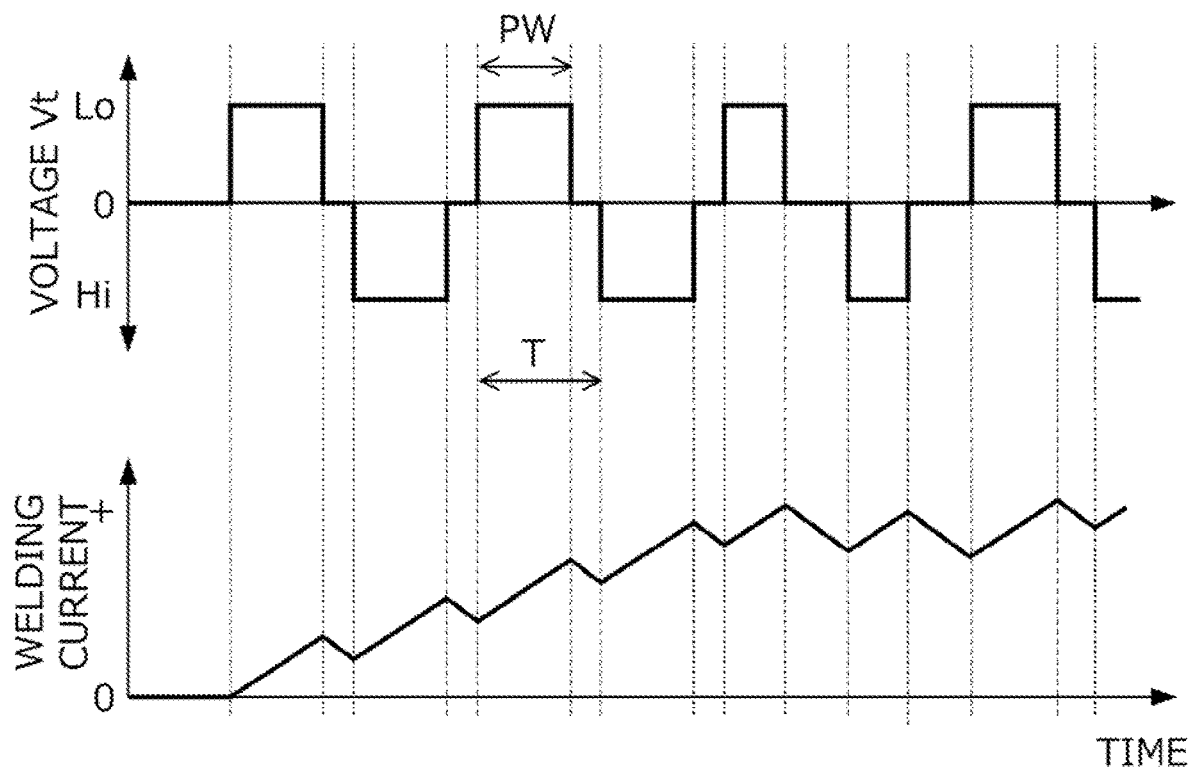
FIG. 3 is a graph showing a relationship between an AC voltage input from an inverter circuit to a transformer and a welding current applied to a pair of electrode chips in the welding power circuit.

FIG. 3 is a graph showing a relationship between an AC voltage Vt input from the inverter circuit 32 to the transformer 34 and the welding current Iw applied to the electrode chips 21, 26 in the welding power circuit 3 as described above.

When the inverter circuit 32 is driven, the AC voltage Vt in the shape of a square wave as shown in FIG. 3 is outputted from the inverter circuit 32. The AC voltage output from the inverter circuit 32 is transformed in the transformer 34, and is further rectified in the rectification circuit 35. Then, the DC welding current Iw is applied to the workpiece W through the electrode chips 21, 26.

As shown in FIG. 3, the welding current Iw increases as a duty cycle increases, the duty cycle being the ratio of a pulse width PW as a period in which the AC voltage Vt is Hi or Lo to a predetermined carrier cycle T. As described later with reference to FIGS. 5 and 6, the control apparatus 33 determines the pulse width PW according to a known feedback control rule such as PI control such that the output current of the welding power circuit 3 detected by the current sensor 3d reaches a target current set by not-shown processing, and performs ON/OFF drive of the plurality of switching elements in the inverter circuit 32 by PWM control with the duty cycle set according to the pulse width PW.

Next, the steps of the spot welding method for joining the workpiece W by the welding system S as described above will be described.

First, as shown in FIG. 1, the robot control apparatus 62 drives the robot body 60 and the articulated arm 61, thereby controlling the position and posture of the spot welding apparatus 1 such that the workpiece W is arranged between the upper electrode chip 21 and the lower electrode chip 26. At this point, the robot control apparatus 62 controls the position and posture of the spot welding apparatus 1 such that the lower electrode chip 26 contacts a lower surface of the third metal plate W3 of the workpiece W.

Figure 4:
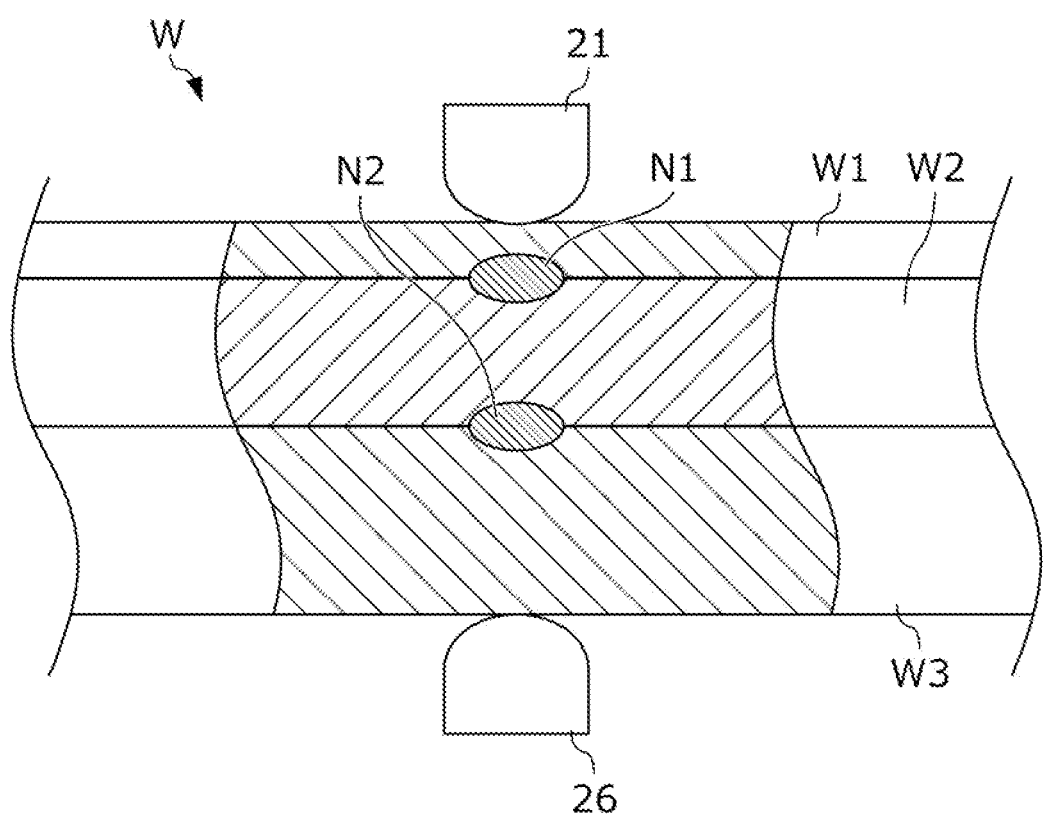
FIG. 4 is a view schematically showing the section of a workpiece during welding, FIG. 4 showing the view in a state in which the welding current is applied to the workpiece while the workpiece is sandwiched and pressurized by the upper electrode chip and the lower electrode chip.

Next, as shown in FIG. 4, the upper adaptor body 23 is slid using the upper electrode chip movement mechanism 4 such that the upper electrode chip 21 approaches the lower electrode chip 26. When the upper electrode chip 21 approaches the lower electrode chip 26 and comes into contact with an upper surface of the first metal plate W1, the workpiece W is sandwiched and pressurized by the upper electrode chip 21 and the lower electrode chip 26.

Next, the control apparatus 33 of the welding power circuit 3 executes the welding current control by the steps described with reference to FIG. 5 while maintaining a state in which the workpiece W is pressurized from both sides by the electrode chips 23, 26, and applies the pulse-shaped welding current to between the upper electrode chip 21 and the lower electrode chip 26. In this manner, as shown in FIG. 4, a first nugget N1 is formed between the first metal plate W1 and the second metal plate W2, and a second nugget N2 is formed between the second metal plate W2 and the third metal plate W3. Thus, the first to third metal plates W1 to W3 are welded to each other.

Figure 5:
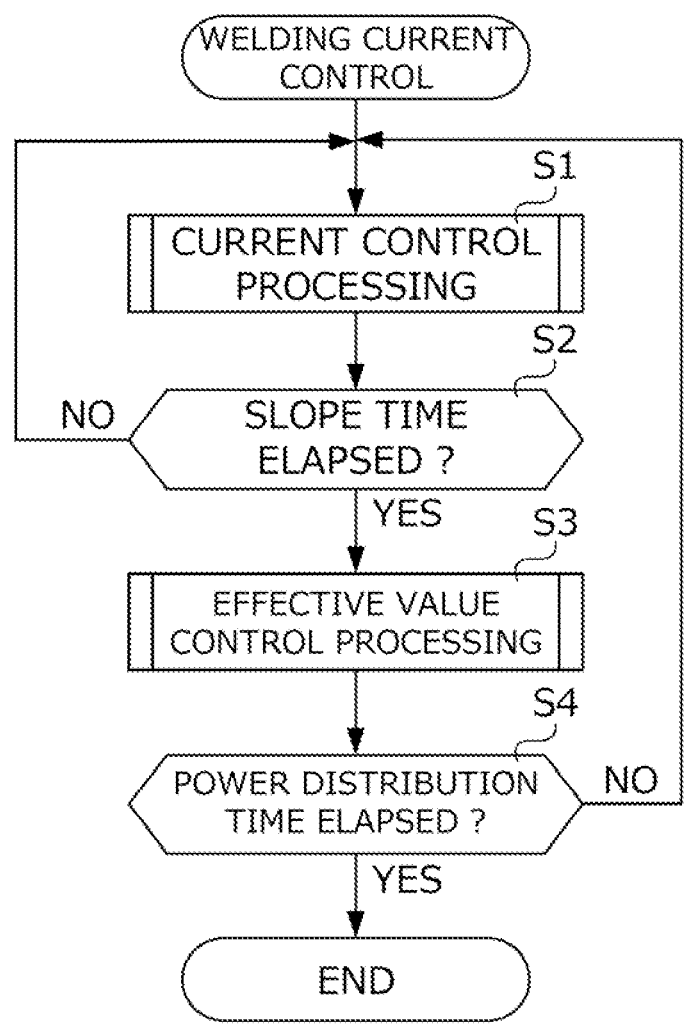
FIG. 5 is a flowchart showing the specific steps of welding current control in a control apparatus.
Figure 6:
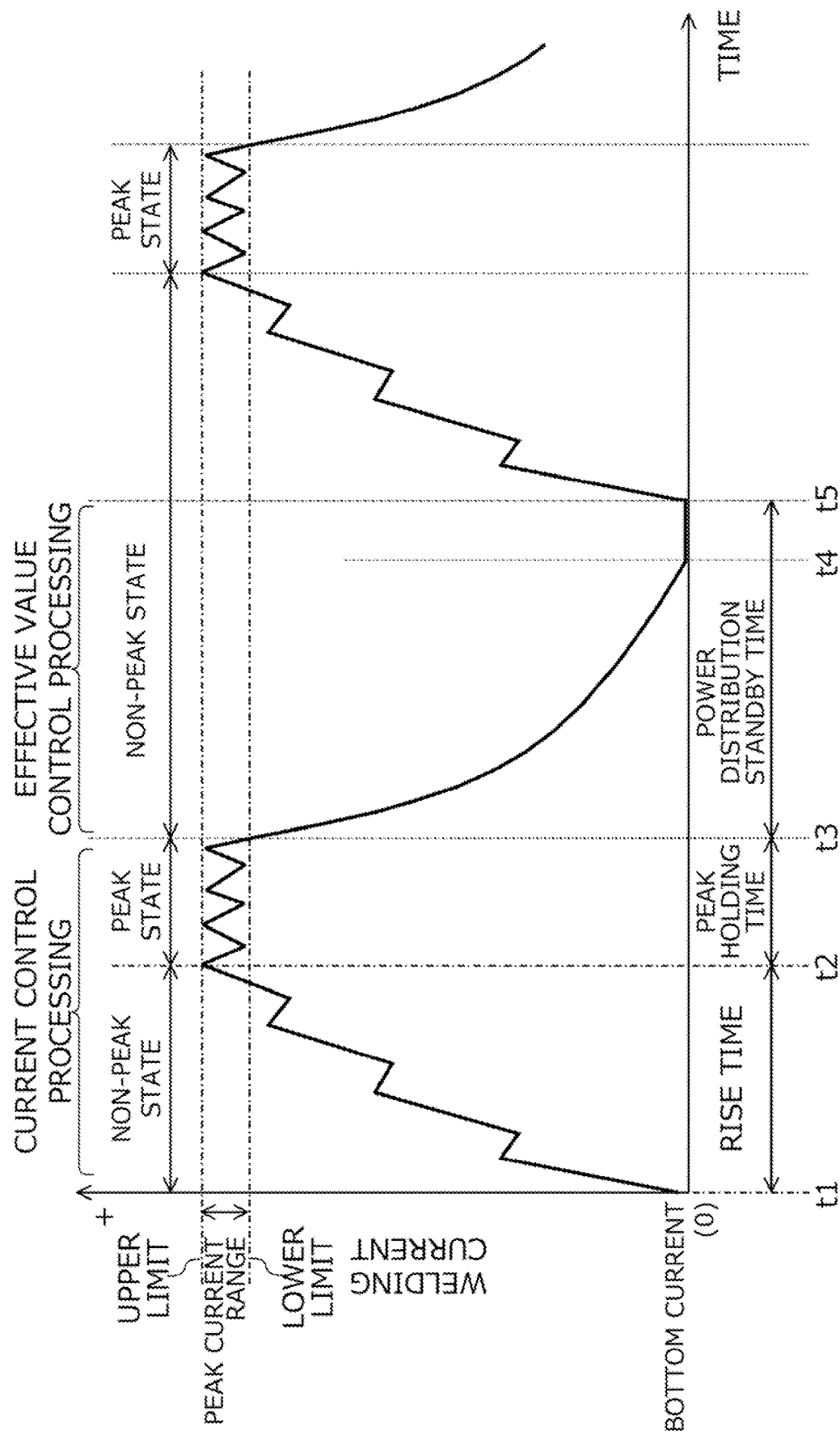
FIG. 6 is a graph showing the waveform of the welding current achieved by the welding current control of FIG. 5.

FIG. 5 is a flowchart showing the specific steps of the welding current control in the control apparatus 33. FIG. 6 is a graph showing the waveform of the welding current achieved by the welding current control of FIG. 5. As shown in FIG. 6, the welding current generated by the welding current control of FIG. 5 has such a pulse-shaped waveform that a peak state in which the welding current reaches or is maintained within a set peak current range and a non-peak state in which the welding current increases to the peak current range again after having decreased to a bottom current (e.g., zero) from the peak current range are alternately achieved.

First, at S1, the control apparatus 33 executes current control processing, and proceeds to S2. As described later in detail with reference to FIG. 7, in this current control processing, the control apparatus 33 maintains the peak state for a predetermined time after having increased the welding current from the bottom current to the peak current range.

At S2, the control apparatus 33 determines whether or not a predetermined slope time has elapsed. As shown in FIG. 5, this slope time is time obtained in such a manner that current rise time which is time until the welding current reaches the upper limit, of the peak current range from the bottom current and peak holding time which is time for which the welding current is maintained within the peak current range are added up, and is set in advance. The control apparatus 33 returns to S1 to continuously execute the current control processing in a case where a determination result at S2 is NO, and proceeds to S3 in a case where the determination result at S2 is YES.

At S3, the control apparatus 33 executes effective value control processing, and proceeds to S4. As described later in detail with reference to FIG. 3, in this effective value control processing, the control apparatus 33 puts execution of the current control processing on hold across a standby time (see FIG. 6) set based on an effective value of the welding current. At S4, the control apparatus 33 determines whether or not a set power distribution time has elapsed after the start of the welding current control of FIG. 5. This power distribution time is equivalent to time taken to join a single spot of the workpiece W by the spot welding apparatus 1, and is set in advance. The control apparatus 33 returns to S1 to execute the current control processing again in a case where a determination result at S4 is NO. The control apparatus 33 ends the processing of FIG. 5 to start joining a next spot of the workpiece W in a case where the determination result at S4 is YES.

As described above, in the welding current control, the control apparatus 33 repeatedly executes the current control processing (see S1) and the effective value control processing (see S3) across the power distribution time, thereby applying the welding current with the pulse-shaped waveform as shown in FIG. 6 to between the electrode chips 21, 26.

Figure 7:
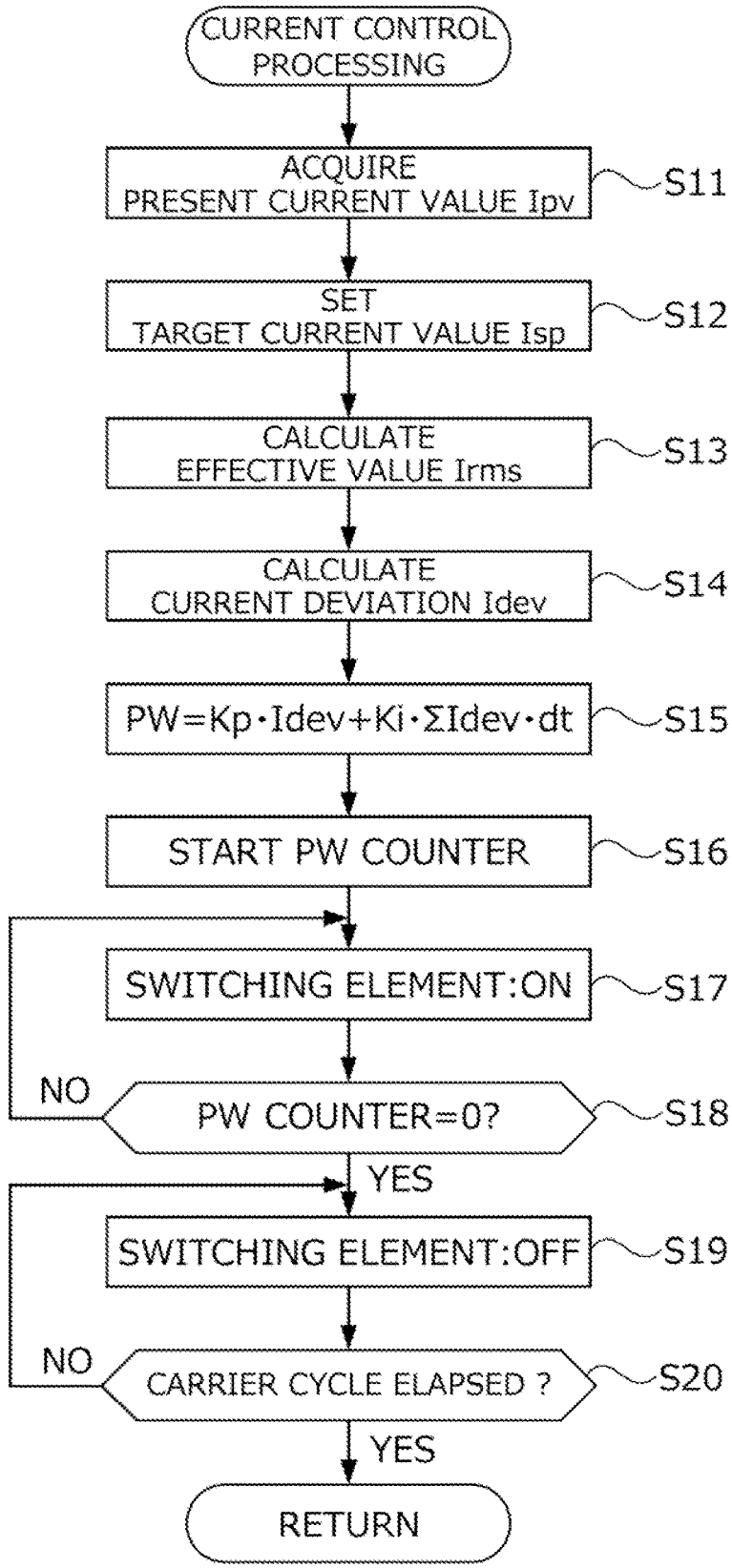
FIG. 7 is a flowchart showing the specific steps of current control processing.

FIG. 7 is a flowchart showing the specific steps of the current control processing. First, at S11, the control apparatus 33 acquires, using the current detection signal transmitted from the current sensor 3d, a present current value Ipv as a present welding current value, and proceeds to S12. At S12, the control apparatus 33 sets a target current value Isp equivalent to a target welding current value, and proceeds to S13. As shown in FIG. 6, the target current value Isp is set between predetermined current rise slopes or between the upper limit and the lower limit of the peak current range.

At S13, the control apparatus 33 calculates an effective value Irms of the welding current by using the present current value Ipv acquired at S11, and proceeds to S14. More specifically, the control apparatus 33 calculates the root-mean-square of the present current value Ipv across time elapsed from the start of the welding current control of FIG. 5 to a present point of time, thereby calculating the effective value Irms.

At S14, the control apparatus 33 calculates a current deviation Idev by subtracting the present current value Ipv acquired at S11 from the target current value Isp set at S12, and proceeds to S15.

At S15, the control apparatus 33 calculates the pulse width PW according to the feedback control rule (specifically, e.g., a PI control rule) based on the current deviation Idev calculated at S14 such that the current deviation Idev reaches zero, and proceeds to S16. More specifically, the control apparatus 33 adds up the result of multiplication of the current deviation Idev by a predetermined proportional gain Kp and the result of multiplication of an integral value of the current deviation Idev by a predetermined integral gain Ki, thereby calculating the pulse width PW.

At S16, the control apparatus 33 starts a PW counter, and proceeds to S17. At S17, the control apparatus 33 turns on the switching elements provided in the inverter circuit 32, and proceeds to S13. At S18, the control apparatus 33 determines whether or not the value of the PW counter reaches zero, i.e., whether or not time equivalent to the pulse width PW has elapsed after the start of the PW counter at S16. The control apparatus 33 returns to S17 to keep the switching elements ON in a case where a determination result at S18 is NO, and proceeds to S19 in a case where the determination result at S18 is YES.

At S19, the control apparatus 33 turns off the switching elements provided in the inverter circuit 32, and proceeds to S20. At S20, the control apparatus 33 determines whether or not the set carrier cycle has elapsed after the switching elements have been turned on at S17. The control apparatus 33 returns to S19 to keep the switching elements OFF in a case where a determination result at S20 is NO, and proceeds to S2 of FIG. 5 in a case where the determination result at S20 is YES.

Figure 8:
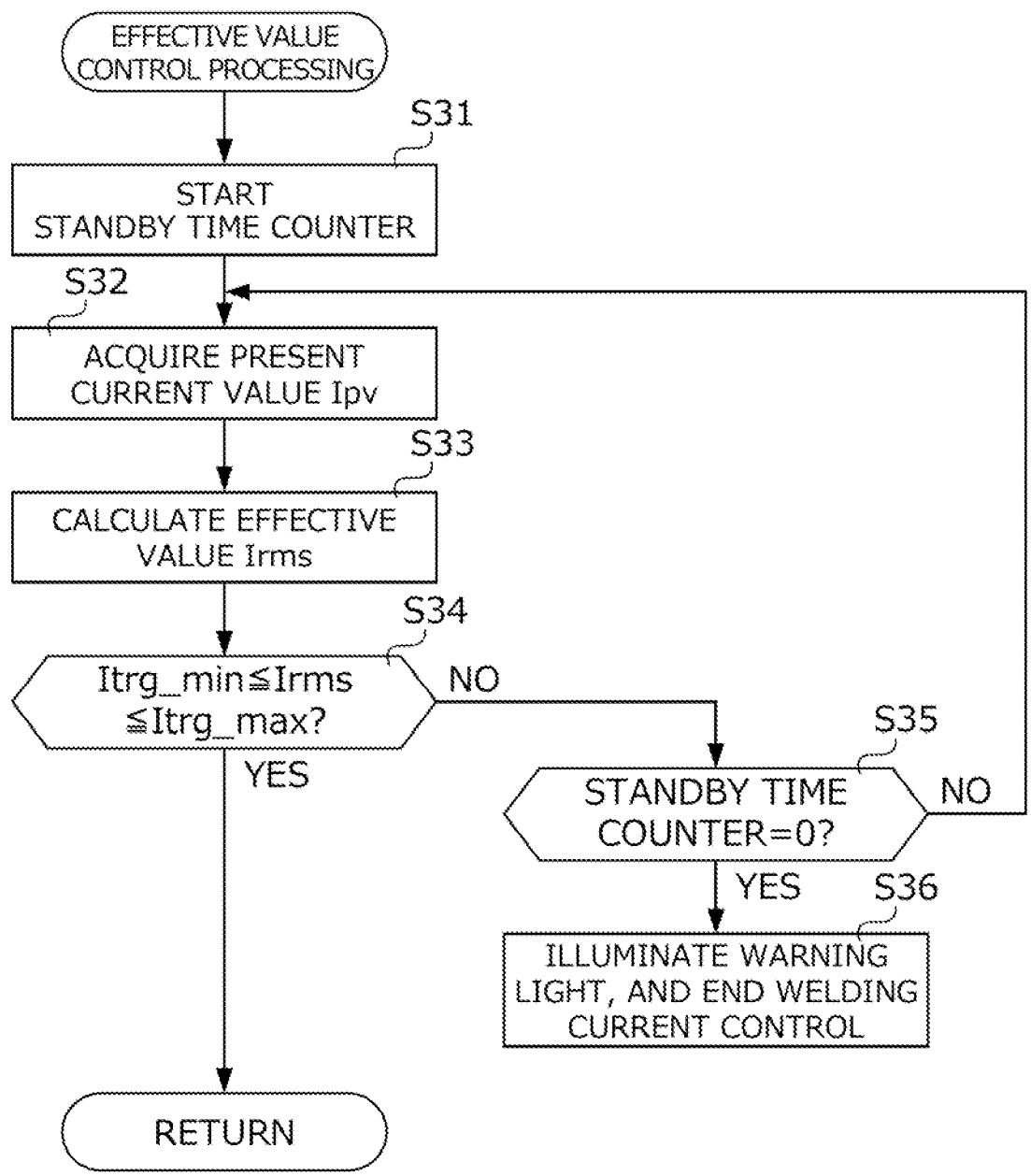
FIG. 8 is a flowchart showing the specific steps of effective value control processing.

FIG. 8 is a flowchart showing the specific steps of the effective value control processing. At S31, the control apparatus 33 starts a standby time counter to measure a power distribution standby time (see FIG. 6) equivalent to an execution time of the effective value control processing, and proceeds to S32. At S32, the control apparatus 33 acquires the present current value Ipv by using the current detection signal transmitted from the current sensor 3d, and proceeds to S33. At S33, the control apparatus 33 calculates, using the present current value Ipv acquired at S32, the effective value Irms of the welding current by the same step as in S13, and proceeds to S34.

At S34, the control apparatus 33 determines whether or not the effective value Irms calculated at S33 reaches within a target effective value range set between a predetermined lower limit Itrg_min and a predetermined upper limit Itrg_max (Itrg_min≤Irms≤Itrg_max). In a case where a determination result at S34 is YES, the control apparatus 33 starts a subsequent cycle of the current control processing, and proceeds to S4 of FIG. 5 to increase the welding current to the peak current range again.

In a case where the determination result at S34 is NO, the control apparatus 33 proceeds to S35, and determines whether or not the value of the standby time counter started at S31 is zero, i.e., whether or not the power distribution standby time has exceeded a predetermined time. In a case where a determination result at S35 is NO, the control apparatus 33 returns to S32, and waits to start the subsequent cycle of the current control processing until the effective value Irms decreases and reaches within the target effective value range. In a case where the determination result at S35 is YES, i.e., a case where the effective value Irms does not reach within the target effective value range within the predetermined time, the control apparatus 33 proceeds to S36 to inform an operator of occurrence of some types of abnormalities by, e.g., illumination of a warning light and end the welding current control.

Next, the waveform of the welding current generated by execution of the welding current control as described above will be described in detail with reference to FIG. 6.

First, the control apparatus 33 repeatedly executes, between time points t1 to t3, the current control processing shown in FIG. 7 until a lapse of the preset slope time. As described with reference to FIG. 7, in this current control processing, the target current value Isp is set, and the pulse width PW is determined by the PI control such that the present current value Ipv acquired through the current sensor 3d reaches the target current value Isp. The inverter circuit 32 is driven by the PWM control with the pulse width PW. Accordingly, as shown in FIG. 6, the welding current increases from the bottom current to the peak current range after the time point t1, and reaches the upper limit of the peak current range at the time point t2. After the time point t2, the welding current is maintained within the peak current range by the PI control in the control apparatus 33. Thereafter, at the time point t3, the control apparatus 33 ends the current control processing (see S1) according to whether or not the slope time has elapsed after the start of the current control processing at the time point t1 (see S2), and starts the effective value control processing (see S3).

By execution of the current control processing as described above, the welding current maintained within the peak current range is applied to the workpiece W. Thus, as shown in FIG. 4, growth of the nuggets N1, N2 is accelerated between the first metal plate W1 and the second metal plate W2 and between the second metal plate W2 and the third metal plate W3. As shown in FIG. 4, the thickness of the first metal plate W1 is smaller than each of the thicknesses of the second metal plate W2 and the third metal plate W3. Thus, a contact resistance between the first metal plate W1 and the second metal plate W2 is smaller than a contact resistance between the second metal plate W2 and the third metal plate W3. Thus, Joule heat generated due to the contact resistance caused by the flow of welding current is greater at a portion between the second metal plate W2 and the third metal plate W3 than at a portion between the first metal plate W1 and the second metal plate W2. Thus, in the peak state, the growth rate of the nugget N2 generated between the second metal plate W2 and the third metal plate W3 is higher than the growth rate of the nugget N1 between the first metal plate W1 and the second metal plate W2.

Returning to FIG. 6, the control apparatus 33 executes, between the time points t3 to t5, the effective value control processing described with reference to FIG. 3. In this effective value control processing, the control apparatus 33 calculates the effective value Irms of the welding current (see S33), and stops driving the inverter circuit 32 until the effective value Irms reaches within the target effective value range. Thus, after the time point t3, the welding current quickly decreases to the bottom current, and reaches the bottom current at the time point t4. Thereafter, at the time point t5, the control apparatus 33 ends the effective value control processing according to whether or not the effective value Irms has decreased and reached within the target effective value range, and starts the subsequent cycle of the current control processing. Thus, after the time point t5, the welding current increases from the bottom current to the peak current range again.

By execution of the effective value control processing as described above, drive of the inverter circuit 32 is stopped across the power distribution standby time until the effective value Irms of the welding current reaches within the target effective value range. Thus, a state in which the welding current is limited to equal to or lower than the lower limit of the peak current range is maintained during the effective value control processing, and therefore, each of the nuggets N1, N2 generated between the metal plates is cooled by heat dissipation. As described above, the thickness of the first metal plate W1 is smaller than each of the thicknesses of the second metal plate W2 and the third metal plate W3. Thus, heat dissipation between the second metal plate W2 and the third metal plate W3 is smaller than heat dissipation between the first metal plate W1 and the second metal plate W2. While the state in which the welding current is limited to equal to or lower than the peak current range is maintained, the amount of cooling of the nugget N2 by heat dissipation is greater than the amount of cooling of the nugget N1 by heat dissipation. The growth rate of the nugget N2 is higher than the growth rate of the nugget N1 in the peak state as described above. Thus, as described above, the state in which the welding current is limited to equal to or lower than the peak current range is maintained across the power distribution standby time, and cooling of the nugget N2 is accelerated. Consequently, occurrence of spatter between the second metal plate W2 and the third metal plate W3 can be reduced. In the effective value control processing, the subsequent cycle of the current control processing is started according to whether or not the effective value Irms of the welding current has reached within the target effective value range, and the welding current is increased again. Thus, energy necessary for growing each of the nuggets N1, N2 between adjacent ones of the metal plates W1 to W3 can be controlled, and therefore, the workpiece can be reliably joined while occurrence of the spatter is reduced as described above.

One embodiment of the present invention has been described above, but the present invention is not limited to above. Detailed configurations may be changed as necessary within the scope of the gist of the present invention.

EXPLANATION OF REFERENCE NUMERALS

S Welding System
W Workpiece
W1 First Metal Plate
W2 Second Metal Plate
W3 Third Metal Plate
1 Spot Welding Apparatus (Welding Apparatus)
2 Gun Body
21 Upper Electrode Chip (Electrode)
26 Lower Electrode Chip (Electrode)
3 Welding Power Circuit
3a Welding Control Circuit
3b DC: Welding Transformer
3d Current Sensor
31 Converter Circuit
32 Inverter Circuit
33 Control Apparatus
34 Transformer
35 Rectification Circuit
L1, L2 Power Line

The invention claimed is:

1. A spot welding method for joining a workpiece by a supply of welding current, comprising:
   a) increasing the welding current toward a set peak current range;
   b) decreasing the welding current from the peak current range toward a bottom current, and then switching to the step a); and
   c) supplying the welding current having a pulse-shaped waveform in which a peak state are alternately achieved by repeatedly performing the steps a) and b), wherein
   in the step b) calculating an effective value of the welding current over a predetermined period while the welding current is in the non-peak state, waiting for the switch to the step a) until the effective value reaches within a set target range, and then switching to the step a) when the effective value reaches within the set target range.

2. The spot welding method according to claim 1, wherein in the step b), in a case where the effective value does not reach within the set target range within a predetermined time, the supply of welding current is stopped and occurrence of an abnormality is informed.

3. The spot welding method according to claim 1, wherein the workpiece is a multilayer body configured such that three or more metal plates are stacked on each other, and at least one metal plate of the three or more metal plates is formed to have a thickness different from thicknesses of the other metal plates.

4. The spot welding method according to claim 2, wherein the workpiece is a multilayer body configured such that three or more metal plates are stacked on each other, and
at least one metal plate of the three or more metal plates is formed to have a thickness different from thicknesses of the other metal plates.

* * * * *